May 11, 1948.   R. J. HOOKER   2,441,194
COMBUSTION CHAMBER AND GAS COLLECTOR ARRANGEMENT FOR POWER PLANTS
Filed April 15, 1944   3 Sheets-Sheet 1

INVENTOR
Ralph J. Hooker
Charles A. Warren
ATTORNEY

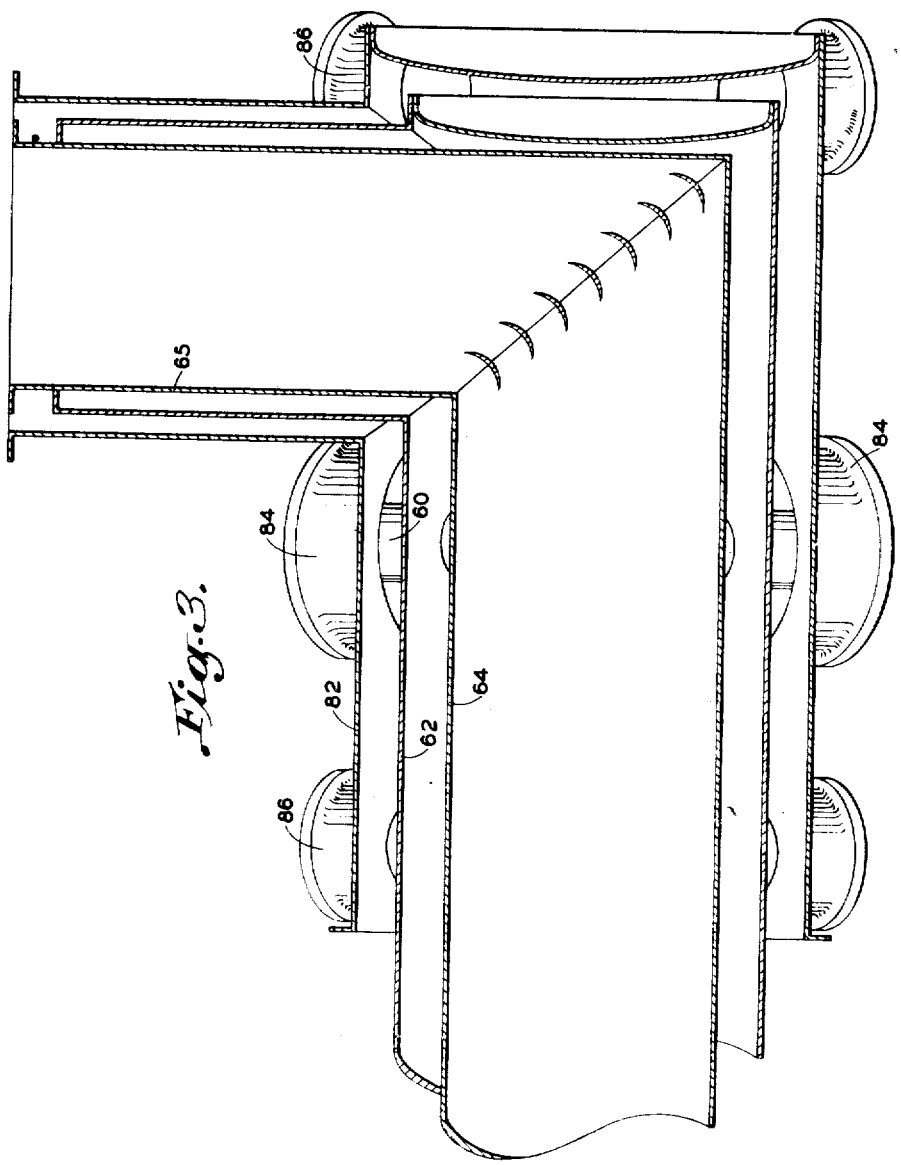

Patented May 11, 1948

2,441,194

UNITED STATES PATENT OFFICE 2,441,194

COMBUSTION CHAMBER AND GAS COLLECTOR ARRANGEMENT FOR POWER PLANTS

Ralph J. Hooker, Manchester, Conn., assignor to United Aircraft Corporation, East Hartford, Conn., a corporation of Delaware Application April 15, 1944, Serial No. 531,302

6 Claims. (Cl. 60—44)

This invention relates to a combustion chamber construction and gas collector for a power plant in which a number of engine-and-compressor units provide gas under pressure which is passed through a combustion chamber for added power prior to use in a turbine or other hot gas engine.

The copending application of Kalitinsky, Serial No. 531,303, filed April 15, 1944, describes a structure in which the combustion chamber is mounted within the gas collector into which the generators exhaust. The exhaust collector may require shielding to prevent heat loss since the exhaust gas, even though lower in temperature than the gas within the combustion chamber, may still be much hotter than the surrounding atmosphere. A feature of this invention is a scavenge tank surrounding the exhaust collector and forming an additional heat shield around the combustion chamber.

The scavenge tank from which gas is blown through the engine cylinder of the engine-and-compressor unit necessarily has a somewhat higher pressure than the exhaust. A feature of this invention is the use of the scavenge tank as the pressure carrying structure, so that the exhaust collector and combustion chamber wall may be very light as they carry only the small load resulting from the pressure differential between scavenge and exhaust.

Another feature of the invention is the saving in space requirements for the power plant since the scavenge tank, the exhaust collector, and the combustion chamber are nested inside one another.

The copending application of Kalitinsky, Serial No. 486,614, filed May 11, 1943, now Patent No. 2,439,473, has a shield around the combustion chamber to which scavenge gas is supplied to prevent "blow-torching" from the combustion chamber in the event of a break in the combustion chamber duct. The present invention, in certain respects, is an improvement on the invention of said application since the scavenge tank which forms the shield is an integral part of the power plant structure.

Other objects and advantages will be apparent from the specification and claims, and from the accompanying drawings which illustrate an embodiment of the invention.

Fig. 3 is a sectional view on a larger scale of a part of the combustion chamber and collector assembly.

Figure 1:
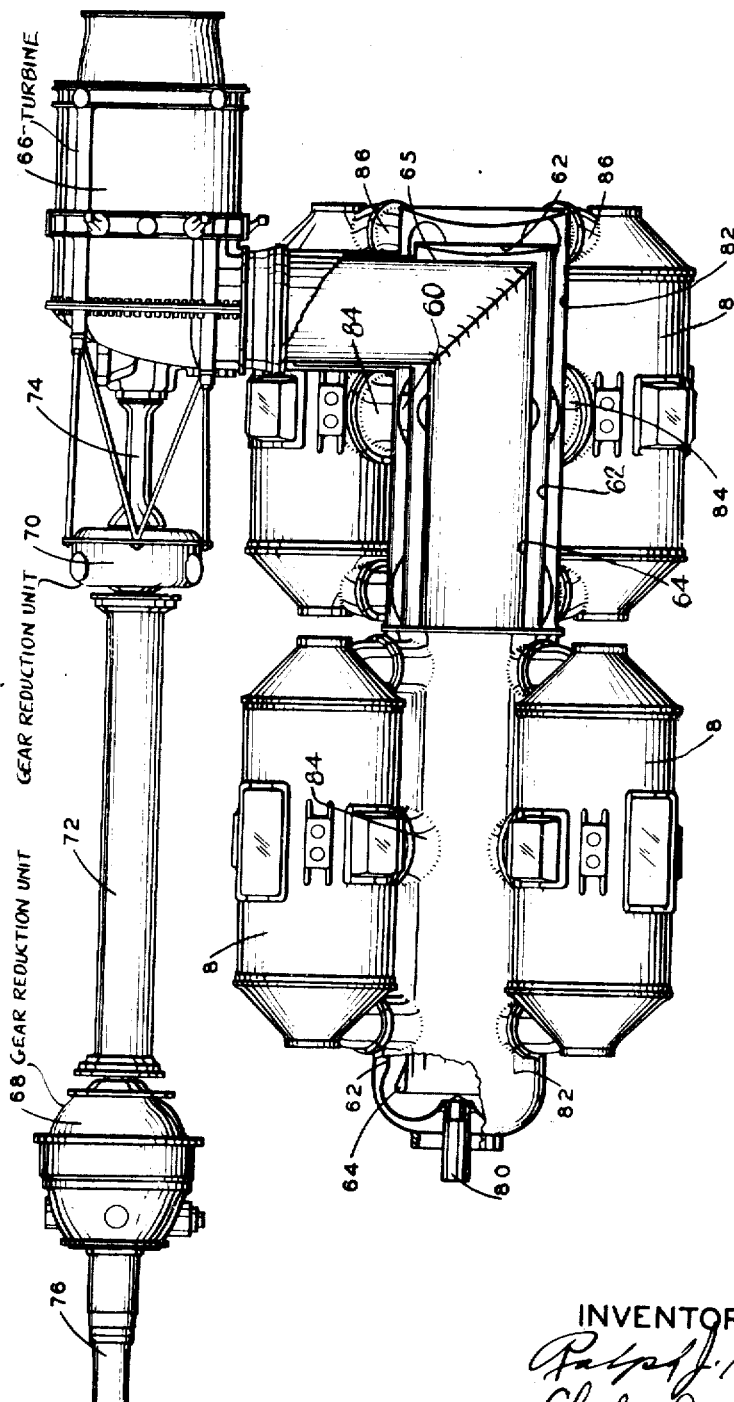
Fig. 1 is a view of the power plant with the combustion chamber and the exhaust and scavenge collectors partly in section.
Figure 2:
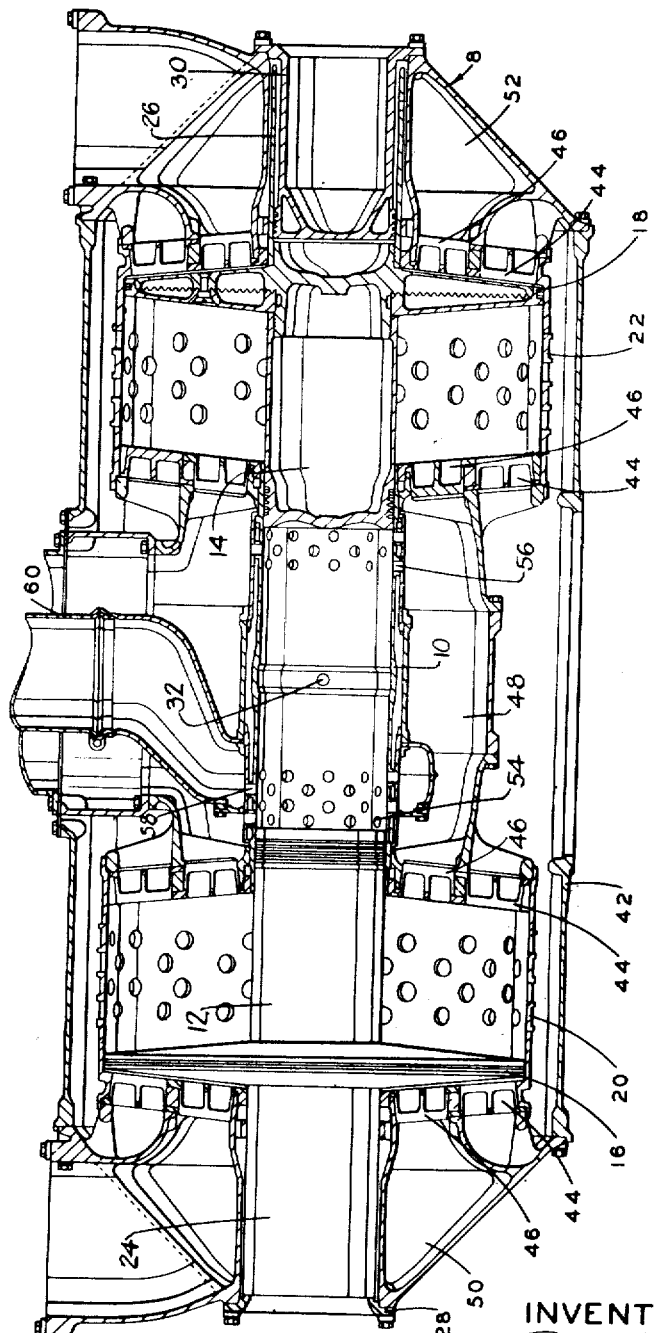
Fig. 2 is a sectional view through one of the units.

Each unit 8, as shown in Fig. 2, includes an engine cylinder 10 having reciprocating pistons 12 and 14 to which compressor pistons 16 and 18 in cylinders 20 and 22 are integrally connected. Sleeves 24 and 26 attached to the compressor pistons complete the reciprocating piston assemblies. The sleeves in combination with stationary pistons 28 and 30 form air spring cylinders.

The piston assemblies are moved apart by the burning of fuel injected into engine cylinder 10 through one or more nozzles 32. Air compressed in the air spring cylinders on the power stroke returns the piston assemblies. The assemblies are always maintained at equal distances from the center of the engine cylinder by a linkage, not shown.

Intake manifold 42 which extends around the compressor and engine cylinders, conducts air to intake valves 44 in the heads of the compressor cylinders through which air alternately enters opposite ends of the cylinders. The compressed air leaves the cylinders through discharge valves 46, also at opposite ends of the compressor cylinders and passes into a central scavenge manifold 48 and end scavenge chambers 50 and 52. These chambers may be interconnected by a scavenge collector, as will be described.

Compressed air from the scavenge chambers enters engine ports 54 and 56 which are uncovered by pistons 12 and 14 at the end of the power stroke, thereby permitting air to be blown through the engine cylinder. Gas in the engine cylinders is discharged through exhaust ports 58 into exhaust manifold 60.

Exhaust gas from the generators is discharged into an exhaust collector 62 to which the exhaust manifolds 60 are connected. In the arrangement shown the generators are arranged in groups of four, substantially uniformly spaced about the collector, the groups being longitudinally spaced from each other along the collector. In this way the collector extends centrally through each of the groups of generators. Gas from the exhaust collector passes through a combustion chamber 64, the discharge end of which is connected by a duct 65 to the inlet of a turbine 66 or other receiver for the hot gases. If the power plant is used for aircraft the turbine may be connected through gear reduction units 68 and 70 and shafts 72 and 74 to a shaft 76 on which a propeller system may be mounted.

The combustion chamber 64 and the duct 65 from the end of the combustion chamber to the turbine are entirely enclosed within the exhaust collector 62. Thus, any heat radiating from the walls of the combustion chamber is absorbed by the gas in the collector surrounding the combustion chamber. The duct, being surrounded by a lower temperature gas at substantially the same pressure may be made of relatively thin material since it does not carry any pressure loads. The arrangement of the generators around the combustion chamber, and the arrangement of the combustion chamber within the duct are claimed in the copending Kalitinsky application, Serial No. 531,303, filed April 15 1944. It is sufficient to note that fuel is admitted to the combustion chamber through a nozzle 80 which may be supported in the end of the exhaust collector.

In the arrangement shown, the exhaust collector is surrounded by a scavenge collector 82 which may extend to the turbine inlet and which receives the scavenge gas from the generators at a pressure slightly higher than the pressure in the exhaust collector. The gas in the scavenge collector is relatively cooler than the enclosed exhaust collector and the scavenge collector may be the pressure carrying member for the entire combustion chamber assembly which includes the combustion chamber and the nested exhaust and scavenge collectors.

The scavenge gas within the collector acts to cool the outer surface of the exhaust collector and thus any heat radiating from the exhaust collector is absorbed by scavenge gas and is not lost. By the nested arrangement, both the combustion chamber duct and the exhaust collector may be relatively thin shells carrying substantially no pressure load and the material of the scavenge collector which is relatively cool need not be of a heat resistant alloy to withstand the pressures to which it will be subjected.

In the patent to Ledwith, No. 2,411,887, issued December 3, 1946, is described an arrangement of the generator such that the scavenge system surrounds the exhaust system as far back as the engine ports. It is sufficient to note that the scavenge collector has flanged inlets 84 to which the central scavenge manifolds of the generators may be directly connected and the exhaust manifolds of the generators pass through these openings and are connected to the exhaust collector. The end scavenge chambers on the generators may be connected by flanged inlets 86 to the scavenge collector.

It is to be understood that the invention is not limited to the specific embodiment herein illustrated and described, but may be used in other ways without departure from its spirit as defined by the following claims.

I claim:

1. A power plant including at least one engine-and-compressor unit, the compressor providing scavenge gas for the engine, in combination with a scavenge collector, connected with the compressor to receive compressed air, and connected with the engine intake, an exhaust collector enclosed within the scavenge collector and connected to the engine exhaust, a combustion chamber within the exhaust collector, means for delivering fuel to said chamber and a duct on the discharge end of the combustion chamber, said duct extending through openings in the collectors.

2. A power plant including a number of scavenged internal combustion engines, and a collector for the scavenge gas for said engines, connected to the engine intakes, in combination with an exhaust collector connected to the engine exhausts for receiving the gas from said engines, said exhaust collector being located within and enclosed by the scavenge collector, a combustion chamber located within the exhaust collector and opening at one end to said exhaust collector, and means for discharging fuel into said chamber, a duct on the discharge end of the combustion chamber, said duct extending through openings in the collectors.

3. A manifold system for a power plant including a number of engine-and-compressor units, the compressor providing scavenge gas for the engine, said system including a scavenge collector connected to the compressors of the units and into which the scavenge gas from the units is discharged, said collector also having connections with the engine intakes, an exhaust collector enclosed within the scavenge collector and into which the exhaust gases from the engines are discharged, said exhaust collector having connections with the engine exhausts, a combustion chamber within the exhaust collector, said combustion chamber being in the form of a duct opening at one end to the exhaust collector, and means for discharging fuel into the open end of said duct.

4. A manifold system for a power plant including a number of engine-and-compressor units, the compressor providing scavenge gas for the engine, said system including a scavenge collector connected to the compressors of the units and into which the scavenge gas from the units is discharged, said collector also having connections with the engine intakes, an exhaust collector enclosed within the scavenge collector, and into which the exhaust gases from the engines are discharged, said exhaust collector having connections with the engine exhausts and a combustion chamber within the exhaust collector, the gas from said first collector being used to cavenge the engines, said combustion chamber being in the from of a duct opening at one end to the exhaust collector, and means for discharging fuel into the open end of said duct.

5. A power plant including a number of free-piston engine-and-compressor units in which the compressors provide gas for scavenging the engine cylinders, and the exhaust gas is exhausted at a pressure substantially above atmospheric to form a power fluid, in combination with a scavenge collector into which the compressors discharge, an exhaust collector within the scavenge collector into which the engines exhaust, and a combustion chamber within said exhaust collector, said combustion chamber being open at one end to the exhaust collector for flow of gas from said exhaust collector into the end of said chamber, and means for discharging fuel into the open end of said combustion chamber, the discharge end of the chamber being located outside of the collectors.

6. A power plant including a number of free-piston engine-and-compressor units in which the compressors provide gas for scavenging the engine cylinders, and the exhaust gas is exhausted at a pressure substantially above atmospheric to form a power fluid, in combination with a scavenge collector connected with said compressors and into which the compressors discharge, said collector also having fluid connection with the engine intakes, an exhaust collector enclosed within the scavenge collector into which the engines exhaust, said exhaust collector having fluid connections with the engine exhausts, and a combustion chamber through which the gas from the exhaust collector is delivered, said combustion chamber being in the form of a duct open at one end to the exhaust collector for a flow of gas from said exhaust collector into the end of said chamber, and means for discharging fuel into the open end of said combustion chamber, the discharge end of said chamber extending through openings in said collectors and being located externally of said collectors.

RALPH J. HOOKER.

REFERENCES CITED

The following references are of record in the file of this patent:

UNITED STATES PATENTS

| Number | Name | Date |
| --- | --- | --- |
| 1,605,484 | Thompson | Nov. 2, 1926 |
| 1,821,662 | Muller | Sept. 1, 1931 |
| 1,839,880 | Hyatt | Jan. 5, 1932 |
| 1,916,242 | Williams | July 4, 1933 |

FOREIGN PATENTS

| Number | Country | Date |
| --- | --- | --- |
| 788,540 | France | July 29, 1935 |

---

Certificate of Correction

Patent No. 2,441,194.                                                                              May 11, 1948.

RALPH J. HOOKER

It is hereby certified that errors appear in the printed specification of the above numbered patent requiring correction as follows: Column 4, line 42, claim 4, for "cavenge" read *scavenge*; line 44, for the word "from" read *form*; and that the said Letters Patent should be read with these corrections therein that the same may conform to the record of the case in the Patent Office.

Signed and sealed this 6th day of July, A. D. 1948.

[SEAL]

THOMAS F. MURPHY,
*Assistant Commissioner of Patents.* connections with the engine exhausts, and a combustion chamber through which the gas from the exhaust collector is delivered, said combustion chamber being in the form of a duct open at one end to the exhaust collector for a flow of gas from said exhaust collector into the end of said chamber, and means for discharging fuel into the open end of said combustion chamber, the discharge end of said chamber extending through openings in said collectors and being located externally of said collectors.

RALPH J. HOOKER.

REFERENCES CITED

The following references are of record in the file of this patent:

UNITED STATES PATENTS

| Number | Name | Date |
|---|---|---|
| 1,605,484 | Thompson | Nov. 2, 1926 |
| 1,821,662 | Muller | Sept. 1, 1931 |
| 1,839,880 | Hyatt | Jan. 5, 1932 |
| 1,916,242 | Williams | July 4, 1933 |

FOREIGN PATENTS

| Number | Country | Date |
|---|---|---|
| 788,540 | France | July 29, 1935 |

Certificate of Correction

Patent No. 2,441,194. May 11, 1948.

RALPH J. HOOKER

It is hereby certified that errors appear in the printed specification of the above numbered patent requiring correction as follows: Column 4, line 42, claim 4, for "cavenge" read *scavenge*; line 44, for the word "from" read *form*; and that the said Letters Patent should be read with these corrections therein that the same may conform to the record of the case in the Patent Office.

Signed and sealed this 6th day of July, A. D. 1948.

[SEAL]

THOMAS F. MURPHY,
*Assistant Commissioner of Patents.*